United States Patent [19]

Southall

[11] Patent Number: 5,159,222
[45] Date of Patent: Oct. 27, 1992

[54] BRUSH HOLDER ASSEMBLY HAVING SNAP-IN REPLACEABLE COMMUTATOR BRUSH HOLDER CARTRIDGES FOR ELECTRIC MACHINES

[75] Inventor: Otway A. Southall, Farmville, Va.

[73] Assignee: Carbone-Lorraine of North America, Parsippany, N.J.

[21] Appl. No.: 624,353

[22] Filed: Dec. 7, 1990

[51] Int. Cl.$^5$ ............................................ H02K 13/00
[52] U.S. Cl. ..................... 310/239; 310/42; 310/43; 310/71; 310/89; 310/233; 310/248; 29/597
[58] Field of Search ............... 310/89, 233, 239, 242, 310/245, 247, 248, 249, 42, 71, 43, 68 A, 45, 68 E; 29/597

[56] References Cited
U.S. PATENT DOCUMENTS

| | | | |
|---|---|---|---|
| 1,469,720 | 10/1923 | Dorsey | 310/239 |
| 2,584,214 | 2/1952 | Luther | 310/239 UX |
| 2,984,758 | 5/1961 | Hansen | 310/239 UX |
| 3,316,431 | 4/1967 | Manoni | 310/239 |
| 3,710,159 | 1/1973 | Dupuis | 310/239 |
| 3,792,298 | 2/1974 | Hamman | 310/242 |
| 3,842,302 | 10/1974 | Apostoleris | 310/239 |
| 3,967,148 | 6/1976 | Walsh | 310/239 |
| 4,311,936 | 1/1982 | Ozaki | 310/242 |
| 4,590,398 | 5/1986 | Nagamatsu | 310/239 |
| 4,845,396 | 7/1989 | Huber | 310/239 |
| 4,855,631 | 8/1989 | Sato | 310/88 |

Primary Examiner—R. Skudy
Attorney, Agent, or Firm—Charles W. Helzer

[57] ABSTRACT

A brush holder plate assembly comprising a brush holder plate fabricated from electrically insulating thermoplastic material and having a plurality of sets of spaced-apart, parallel, raised guiding and support rails integrally formed on one surface of the plate. The plate further has a centrally formed aperture of sufficient cross sectional dimension to be slipped over the commutator of an electric machine after complete assembly of all the parts of the machine. The sets of spaced-apart, parallel, raised guiding and support rails project radially outward away from the centrally formed aperture like the spokes of a wheel. A plurality of snap-in-place, brush holder cartridges are removably secured by slide catches to the respective sets of spaced-apart parallel raised guiding and support rails for physically supporting commutating brushes in an array surrounding the commutator of the electric machine with one exposed end of each brush in physical and electrical contact with the commutator. For this purpose, the brush holder cartridges each further include biasing springs for spring tensioning brushes into physical and electrical engagement with the commutator of an electric machine to supply or conduct electric current between the commutator and the brush and the electric current supply.

23 Claims, 3 Drawing Sheets

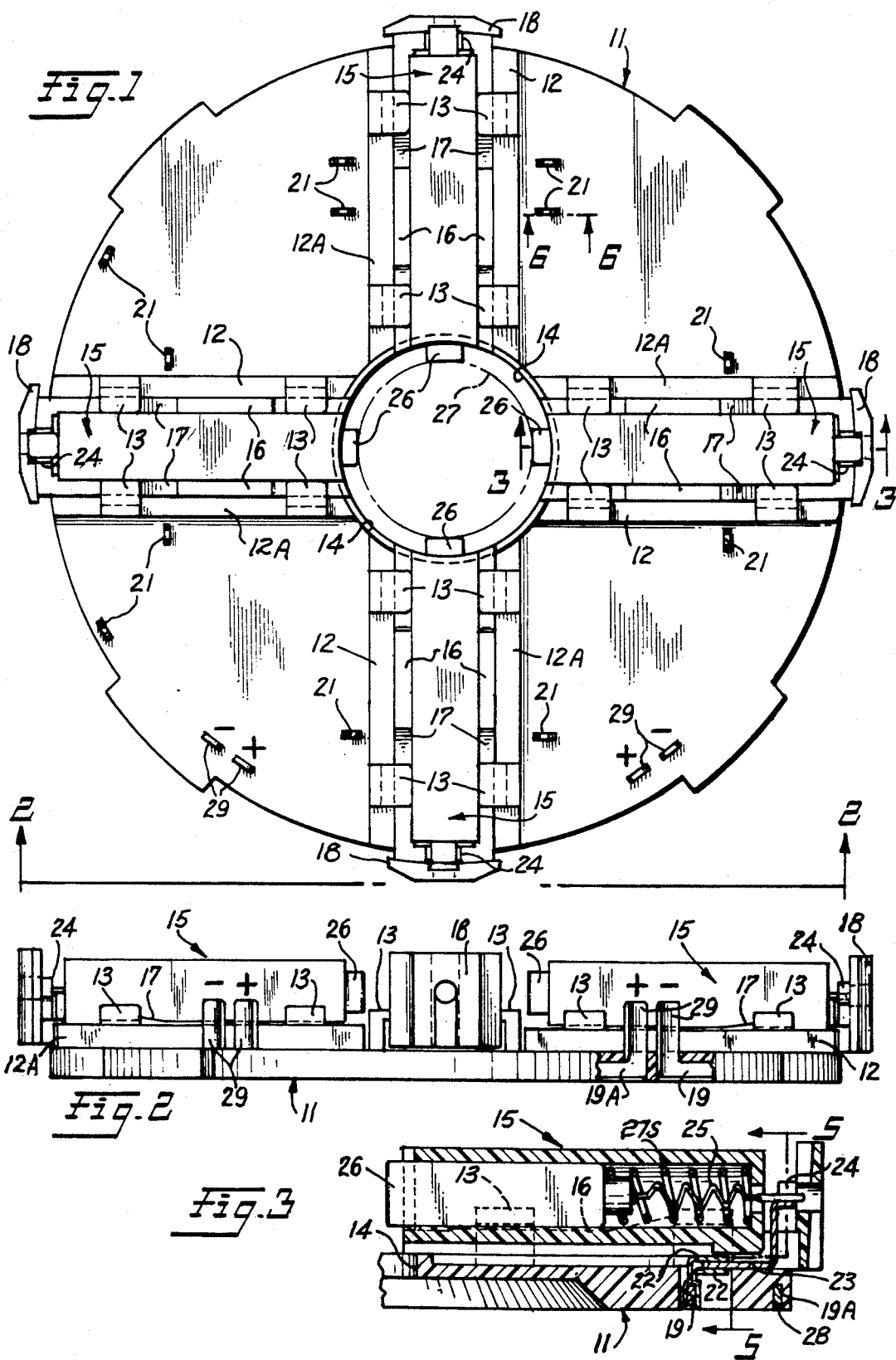

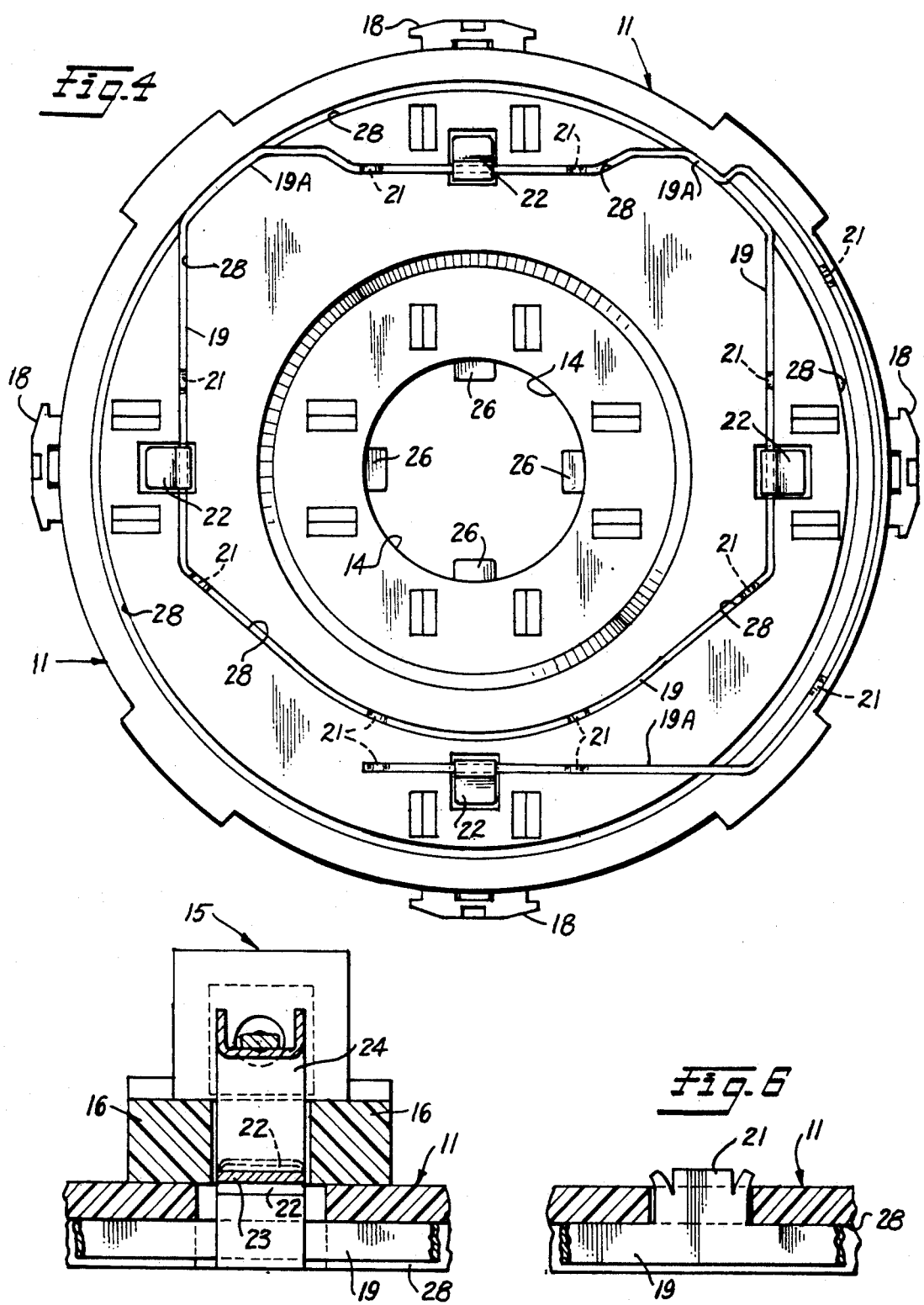

5,159,222

BRUSH HOLDER ASSEMBLY HAVING SNAP-IN REPLACEABLE COMMUTATOR BRUSH HOLDER CARTRIDGES FOR ELECTRIC MACHINES

FIELD OF INVENTION

This invention relates to an improved commutator brush holder plate assembly for electric machines such as motors and generators.

More specifically, the invention relates to a novel brush holder plate assembly for supporting an array of snap-in, replaceable, brush holder cartridges for slidably supporting commutator brushes in place on the commutator of DC motors and generators, commutating AC motors and generators, and like electric machines. The assembly is designed so that the snap-in brush holder cartridges are readily replaceable on the brush holder plate assembly upon one or more of the commutator brushes becoming worn. With the invention, this can be done without requiring break-down and subsequent reassembly of any part of the electric motor to get at the commutating brushes.

The novel design of the brush holder assembly also allows an electric machine to be completely assembled during manufacture prior to mounting the commutating brush holder plate assembly on the electric machine commutator to complete the machine's construction.

BACKGROUND PRIOR ART

Commutator brush assemblies are used on most rotating direct current motors and generators and on a large number of commutating, alternating current motors and generators, which employ segmented commutators to supply or withdraw electric current from such machines. Commutator brush holder assemblies as such are well known to the industry, and are available in a variety of designs and operating characteristics. The following list of United States issued patents are typical of the types of commutator brush holder assembly designs heretofore known and available to the art.

U.S. Pat. No. 2,584,214 entitled "Brush Holder for Electric Motors and the Like" which describes a set of opposed channel-shaped brush holders that cooperate with an insulating backing plate to define a plurality of open ended brush holder tubes. A commutating brush is endwise slidably mounted in each tube with the brushes being pressed to engagement with a commutator ring by a coil spring enclosed by the channel-shaped brush holder tubes.

U.S. Pat. No. 2,984,758 issued May 16, 1961 for a "Electric Motor Brush Holder" describes a combined brush holder and motor housing wherein the brush holder is made integral with the motor housing to facilitate accurate alignment of the brush with the motor commutator.

U.S. Pat. No. 3,316,431 issued Apr. 25, 1967 is for a "Current Collector Contact Means" and describes a brush holder structure for commutator-type electric machines which utilizes wedge-shaped dovetailed and key support means for the brush holders to firmly secure them in place.

U.S. Pat. No. 3,710,159 issued Jan. 9, 1973 for a "Electric Brush and Lead Holder" discloses a combination electric brush and lead holder for electric motors having a spring located therein which urges the associated brush to extend outwardly of the holder in a telescoping fashion and into contact with a machine commutator. The spring is interposed between the inner end of the brush and a disc-shaped terminal end of an electrical lead within the holder structure and is both current carrying and resilient.

U.S. Pat. No. 3,792,298 issued Feb. 12, 1974 for a "Electric Motor Brush Card" in which a planar dielectric support in the form of a card is mounted within a motor housing in a plane disposed perpendicular to the motor armature axis. A plurality of brush holders in the form of rectangular U-shaped insulating members are concentrically arranged on the insulating card about an armature receiving opening defined in the insulating card. The brush holders are of a sheet metal construction of U-shaped cross sectional configuration with open ends and slots defined in the base and leg portions for receiving a brush conductor and portions of a coil tension spring which engages a brush slidably received within the brush holder and biases the brush radially inward into engagement with the armature commutator.

U.S. Pat. No. 3,842,302 issued Oct. 15, 1974 for a "Electrical Snap-In Terminal and Brush Housing and Method of Assembly" which discloses a terminal blade member provided with a plurality of mutually opposed resilient tongues which is used together with a brush housing to compressibly confine a brush biasing means in the form of a coil spring that in turn biases a brush into engagement with the commutator of an electric motor. The terminal blade member is removably secured within the brush housing so as to facilitate changing of worn brushes.

U.S. Pat. No. 3,967,148 issued Jun. 29, 1976 for a "Brush Holder Assembly" in which the brush holder assembly comprises an elongated brush supporting channel having a pair of longitudinal slots in opposite walls thereof and a plate member having wire connectors and retaining catches for holding the plate member in position over a brush. A brush biasing coil spring is supported within the enclosed channel enclosed by the plate member. A plurality of such brush holders may be mounted on a single plate which forms the base of all of the channels, and the plate member is provided with a male terminal tab for receiving the female terminal of a current supply wire.

U.S. Pat. No. 4,311,936 issued Jan. 19, 1982 for a "Brush Holding Device for Electric Motor" describes a brush holding device for an electric motor of small size having a brush cap that is removably mounted to a brush holder so that the brush can be readily replaced. The brush cap is constructed such that a pair of elastic arms axially extend from both sides of a coil retaining portion of the brush cap and includes a vertical wall formed with a keyhole for preventing the brush cap from radial movement and slipping out of the brush holder.

U.S. Pat. No. 4,590,398 issued May 20, 1986 for a "Brush Holder" discloses a brush holder comprising a brush box and a brush terminal. The brush box includes a brush sliding tube within which the brush is slidably supported. The brush terminal has a pair of bent pieces and a central portion therebetween for connecting a pigtail conductor for supply of electric current to and from the brush. A coil spring within the brush sliding tube biases the brush into contact with the commutator of an electric motor.

U.S. Pat. No. 4,855,631 issued Aug. 8, 1989 for a "Brush Holding Device" discloses a brush box formed into tubular shape and having opposite open ends and has a brush slidably supported in a hollow portion thereof. A cap is provided to one end portion of the brush box to block the end portion to provide a reaction force for a coil spring for bringing the brush into sliding contact with a commutator.

While the above-listed prior art devices, and others similar to them, are satisfactory in many respects, they nevertheless require disassembly of substantial parts of the electric machines on which they are used in order to change brushes, or require welding of pigtails to the brush, or other similar characteristics which prevent them from becoming widely accepted, In order to overcome these problems and provide an electric brush holder which allows a technician to easily change the worn brushes of electric machines employing commutators, and also to facilitate final assembly of such machines during manufacture, the present invention was devised.

SUMMARY OF INVENTION

It is therefore a principal object of the present invention to provide a new and improved brush holder assembly with snap-in replaceable commutator brush holder cartridges for electric machines having commutators, and which greatly facilitates removal and replacement of worn commutator brushes by simply replacing the removable commutator brush holder cartridge. In addition, the novel brush holder assembly facilitates manufacture of electric machines which otherwise are completely assembled by allowing the brush holder assembly to be fitted over the commutator portion of the motor after complete assembly of all other parts of the motor.

In practicing the invention, a brush holder plate assembly is provided for mounting a plurality of commutating brushes around the commutator of an electric machine after the electric machine has been otherwise completely assembled. The novel brush holder plate assembly comprises a brush holder plate fabricated from electrically insulating thermoplastic material and having a plurality of sets of spaced-apart, parallel guiding and support channels comprised by rails integrally formed on one surface of the plate. The brush holder plate further has a centrally formed aperture of sufficient cross sectional dimension to be slipped over the commutator of an electric machine after complete assembly of all of the parts of the machine. The sets of spaced-apart, parallel guiding and support channels project radially outwardly away from the centrally formed aperture like the spokes of a wheel. A plurality of snap-in-place, replaceable brush holder cartridges are removably secured by slide catches to the respective sets of spaced-apart parallel guiding and support channels for physically supporting commutating brushes in an array surrounding the commutator of the electric machine with one exposed end of each brush in physical and electrical contact with the commutator. For this purpose, the brush holder cartridges each further include a coiled biasing spring for spring tensioning the commutating brush into physical and electrical engagement with the commutator of the electric machine to supply or conduct electric current between the commutator and the brush and an electric current supply.

BRIEF DESCRIPTION OF DRAWINGS

These and other objects, features and many of the attendant advantages of this invention will be appreciated more readily as the same becomes better understood from a reading of the following detailed description, when considered in connection with the accompanying drawings, wherein like parts in each of the several figures are identified by the same reference characters, and wherein:

FIG. 1 is a top view of an improved brush holder assembly according to the invention;

FIG. 2 is an elevational side view of the brush holder assembly shown in FIG. 1 taken along line 2—2 of FIG. 1;

FIG. 3 is an enlarged fragmentary, vertical sectional view through one of the brush holders taken along the line 3—3 of FIG. 1;

FIG. 4 is a bottom view of the brush holder assembly and shows the arrangement of the supply electrical conductor strips on the bottom of the brush holder plate and their construction;

FIG. 5 is a further, enlarged, fragmentary, transverse sectional view taken on the staggered section line 5—5 of FIG. 3;

FIG. 6 is a fragmentary vertical sectional view showing how the conductor strips are staked to the back of the brush holder plate as viewed on the line 6—6 of FIG. 1.

BEST MODE OF PRACTICING THE INVENTION

Figure 7:
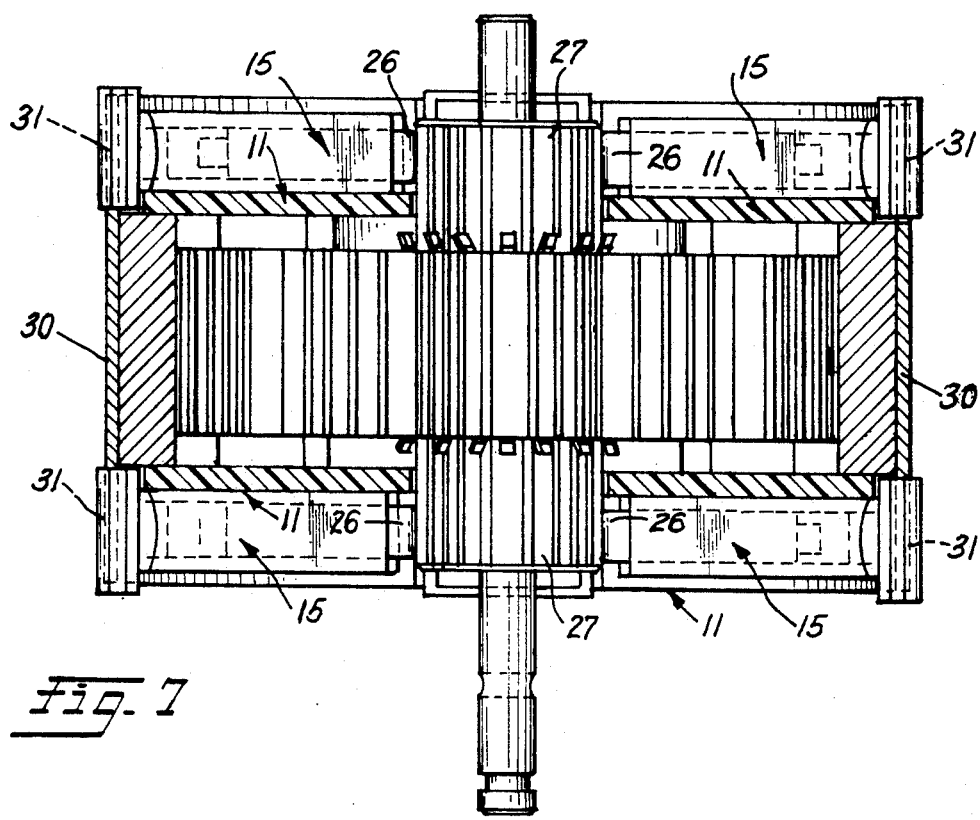
FIG. 7 is a side elevational view of an electric machine having a novel brush holder assembly according to the invention mounted thereon.

FIG. 1 is a top plan view of a commutating brush holder plate assembly having snap-in-place, replaceable commutating brushes for electric machines such as motors and generators, constructed according to the invention. The brush holder plate assembly comprises a generally flat, brush holder or support plate 11 of electrically insulating, thermoplastic, material having a plurality of sets of spaced-apart, parallel, commutating brush cartridge guiding and support channels comprised by raised rails 12 and 12A formed on its upper surface. The support plate 11 is about 0.060 inches thick with the four sets of guide and support channels 12 and 12A being integrally formed thereon. Each set of guide and support channels are provided with four hold down clips 13, one pair of coacting hold down clips 13 being provided at each end of the raised guiding and support channels. Plate 11 has a centrally formed aperture shown at 14 from which the guiding and supporting channels 12 and 12A project radially outwardly away from the centrally formed aperture 14 in the manner of the spokes of a wheel. The central aperture 14 has a sufficient diameter so that plate 11 easily can be slipped over the commutator of an electric machine after assembly of the machine.

The guiding and support channels 12 and 12A are designed to guide and support respective snap-in-place, replaceable, brush holder cartridges 15, best seen in FIG. 2 of the drawings, which also are fabricated from thermoplastic insulating material. As best shown in FIG. 1, there are sets of four coacting hold down clips 13 provided for each pair of guiding and support channels 12 and 12A which hold the respective brush holder cartridge 15 in place on plate assembly 11. The brush cartridges 15 each have two widened retaining tab portions 16, one on each side, formed on their bottom surface which slide within the guiding and support rails 12 and 12A and below the sets of four hold down clips 13, as best seem in FIG. 3. The tab portions 16 are integrally formed on the bottom surface of the brush cartridge holders 15. Each of the widened tab portions 16 on the upper surface thereof which slides under and coacts with the two outermost hold down clips 13 (which are furthest away from central aperture 14 of each set of four) has a tapered ramp 17 integrally formed thereon of the thermoplastic material which terminates in an abrupt vertical back surface. As the brush cartridge is slid into place in one of the channels 12, 12A, the two outermost hold down clips 13 snap into place in back of the abrupt vertical back surface of the ramps 12 a stop to prevent slipping out of the brush holder cartridges 15 once they are inserted in place on the brush holder assembly plate 11.

As seen in all of FIGS. 1, 2 and 3, the widened tab portions 16 extend beyond the main body of the brush cartridge 15 and terminate in an integrally formed push plate 18 used to push the brush cartridges 15 into place on plate 11 between the respective sets of guiding and support rails 12 and 12A. The push plate 18 is integrally formed with the brush cartridge 15 and widened tab portion 16.

As best seen in FIG. 4 of the drawings, the brush holder plate 11 has a pair of elongated electrical conductor strips 19 and 19A formed on its undersurface opposite from the surface on which the raised brush holder cartridge guiding and support rails 12 and 12A are formed. Conductor strips 19 and 19A serve to supply electric current to or from a plurality of commutating brushes supported within the brush holder cartridges 15 on the brush holder plate 11. The respective electrical conductor strips 19 and 19A at intermediate points and at the free ends thereof, have stake portions which are extruded and/or bent at substantially right angles to the elongate axis of the conductor strips. The extruded and bent stake portions extend through the thickness of the brush holder plate and are crimped over as shown at 21 in FIG. 6 so as to secure the conductor strips 19, 19A to the brush holder plate 11.

The conductor strips 19, 19A at points intermediate each set of guiding and support channels have a lip connector 22 secured thereto with the lip portion of the lip connector extending through the plate 11 to the upper surface of the plate to form one part of a slide-together switch contact connector for supplying electric current to or from the respective commutator brushes supported within the replaceable brush holder cartridges.

As best seen in FIGS. 3 and 5 of the drawings, the replaceable brush holder cartridges 15 each have a coacting spade connector 23 secured to the underside thereof for making slide-together physical and electrical contact with a respective lip connector 22 upon a brush cartridge 15 being slid into assemble on the brush holder plate 11 between a set of spaced-apart parallel cartridge guiding and support channels 12 and 12A. As best shown in FIG. 5 of the drawings, the spade connector 23 is integrally formed with a stamped-out, metal piece having upper channel portion 24 to which is soldered, braised or welded a pigtail conductor 25 (best shown in FIG. 3). The opposite end of the pigtail conductor 25 is soldered, braised or welded to one end of a commutating electric brush 26 slidably supported within the brush cartridge 15. A coiled tension spring 27S also is supported within the brush holder cartridge 15 and serves to tension the commutating brush 26 to the left as shown in FIG. 3 so that the free end of the brush is biased into engagement with the commutator (indicated by dotted lines 27 in FIG. 1) of an electric machine.

The elongated conductor strips 19, 19A are blanked out from flat stock conductive material such as copper or bronze to provide appropriate cross sectional dimensions to the conductor strips 19, 19A that are proportioned to accommodate a calculated current flow for supply to or from the commutator brushes 26. The conductor strips 19, 19A thus formed are set into preformed, recessed channel 28 (best seen in FIGS. 5 and 6 of the drawings) formed on the bottom side of the brush holder plate 11. The conductor strips 19, 19A then are staked in place by the integrally formed projecting stake portions on each strip, such as shown at 21 in FIG. 6, that extend through the plate 11 thickness at the bottom of the recessed channels and are crimped to hold the conductor strips 19 and 19A within the channels 28 on the brush holder plate.

The conductor strips 19, 19A are essentially rectangular in cross section with the wide part of the strips extending vertically relative to the plane of the brush holder plate 11 while disposed in the integrally formed, recessed channel 28. In this position the intermediate stake portions 21 and ends of the conductor strips 19 and 19A are disposed at right angles to the elongate axis of the conductor strips and extend through the thickness of the brush holder plate 11. To expose the lip connectors 22 to a coacting spade connector 23 on the bottom surface of the brush holder cartridges, the plate 11 has suitable openings formed therein at points along the path of channels 28 for conductor strips 19,19A (between rails 12 and 12A) through which the lip connectors have a portion that extend through and engage a respective conductor strip 19 or 19A at these points. Power supply connector prongs for connection of the conductor strips 19 and 19A to a source of electric current or to an output distribution conductor are provided as shown at 29 in both FIG. 1 and FIG. 2. Male prongs 29 are formed by extruded male prong portions and bent over end portions of strip conductors 19 and 19A to form two sets of male prongs 29. The male prongs thus provided are designed to coact with a compatible female plug on a current supply conductor (not shown).

FIG. 7 is a side, elevational view of a typical electric machine having a novel brush holder assembly according to the invention mounted thereon. In FIG. 7, the machine is provided with both upper and lower commutator rings. For this machine, therefore, two brush holder plate assemblies according to the invention would be provided as illustrated. In this application, the plates 11 are mounted with what has been described as their upper surface, being the upper surface only for the lower brush holder plate assembly, and being the undersurface for the upper plate assembly. The removable brush holder cartridges 15 are shown with their commutating brushes 26 biased into engagement with the commutator ring 27 of the motor. For use in such a motor the central aperture opening 14 is sufficiently large to allow the plate assembly to slip over the end of the commutator ring 27 and then secured in place.

Figure 8:
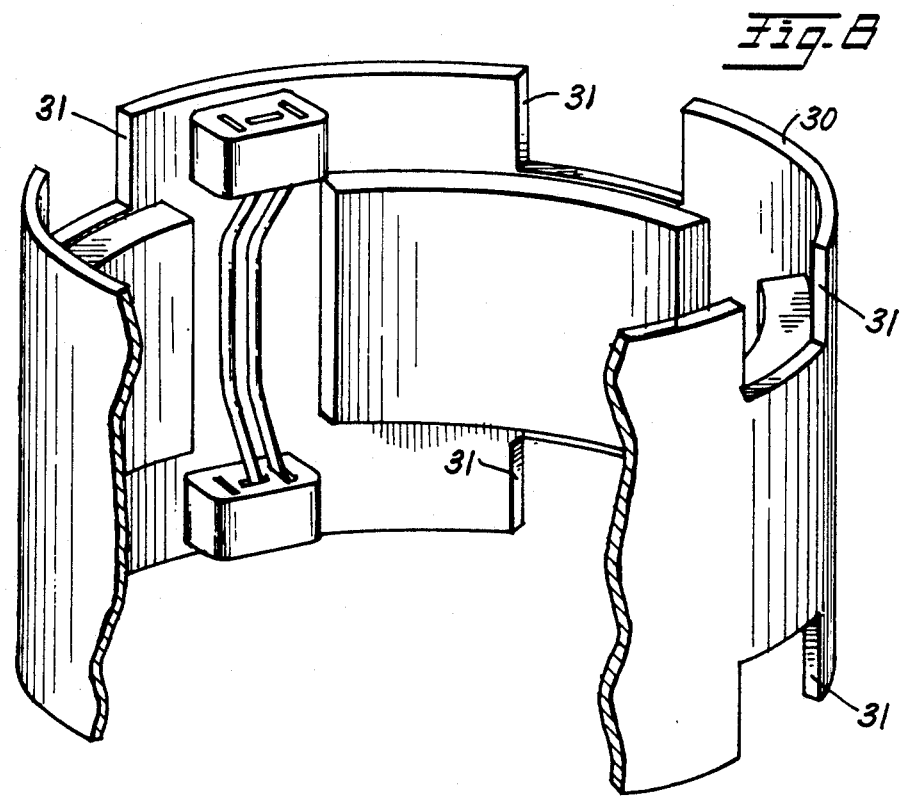
FIG. 8 is a perspective, partially broken-away view of a housing used on the electric machine shown in FIG. 7, and illustrates the side openings provided in the machine housing whereby the replaceable brush holder cartridges comprising a part of the novel brush holder assembly readily can be removed and replaced.

FIG. 8 is a partially broken away, perspective illustration of the outer housing 30 for a machine such as shown in FIG. 7, and illustrates how it would be provided with openings such as shown at 31 to allow for accessing and installing or removing the replaceable cartridges 15 without requiring substantial disassembly of the motor parts or even removing the outer housing of the motor.

From the foregoing description it will be appreciated that the invention provides a brush holder plate assembly for mounting a plurality of commutating brushes around the commutator of an electric machine after the electric machine has otherwise been completely assembled. The novel brush holder plate assembly comprises a brush holder plate fabricated from electrically insulating thermoplastic material and having a plurality of sets of spaced-apart parallel, raised brush holder cartridge guiding and support channels integrally formed on one of its surfaces. The brush holder plate further has a centrally formed aperture of sufficient cross sectional dimension to be slipped over the commutator of an electric machine after complete assembly of all other parts of the machine. The sets of spaced-apart, parallel, raised brush holder cartridge guiding and support channels project radially outward away from the centrally formed aperture like the spokes of a wheel. A plurality of snap-in-place, replaceable brush holder cartridges are removably secured by slide catches to the respective sets of spaced-apart, parallel, guiding and support rails for physically supporting the commutating brushes in an array surrounding the commutator of an electric machine with one exposed end of each brush in physical and electrical contact with the commutator.

INDUSTRIAL APPLICABILITY

The invention makes available to the industry an improved commutator brush holder plate assembly for electric machines such as DC motors and generators and commutating AC motors and generators. The brush holder plate assembly makes it possible to support an array of snap-in-place, replaceable, brush holder cartridges for slidably supporting commutator brushes in place on the commutators of electric machines. The assembly is designed such that the snap-in-place brush holder cartridges readily can be replaced by a serviceman on the brush holder plate assembly upon one or more of the commutator brushes becoming worn. With the invention, such replacement can be done without requiring disassembly and subsequent reassembly of any part of the electric motor to get at the commutating brushes. Further, the brush holder assembly allows an electric machine to be completely assembled during manufacture prior to mounting the commutating brush holder plate assembly on the electric machine commutator to complete the machine's construction.

Having described one embodiment of an improved commutator brush holder plate assembly according to the invention, it is believed obvious that other modifications and variations of the invention will be suggested to those skilled in the art in the light of the above teachings. It is therefore to be understood that changes may be made in the particular embodiment of the invention described which are within the full intended scope of the invention as defined by the appended claims.

What is claimed is:

1. A brush holder plate assembly having a plurality snap-in place, readily replaceable brush holder cartridges for mounting commutating brushes for electric machine such as motor and generator, comprising a generally flat two-sided brush holder plate of electrically insulating material having a plurality of sets of spaced-apart, parallel, commutating brush holder cartridge guiding and support channels integrally formed on a first flat surface thereof; said guiding and support channels projecting radially outwardly away from a central aperture formed in the brush holder plate for accommodating an electric machine commutator; a plurality of replaceable, commutating brushes supported on the brush holder plate; said brush holder plate having a plurality of elongated, electrical power supply conductor strips formed on a second flat surface of the plate opposite from the brush holder cartridge guiding and support channels for supply of electric power to and from the plurality of replaceable commutating brushes; said plurality of snap-in place, readily replaceable, brush holder cartridges for holding the replaceable commutating brushes, said readily replaceable brush holder cartridges having slide catches thereon for slidably securing and readily releasing said readily replaceable brush holder cartridges to or from the brush holder plate within said guiding and support channels to thereby physically support the replaceable commutating brushes within their brush holder cartridges in an array around said electric machine commutator; and each readily replaceable brush holder cartridge further including at least one slide together switch contact for slide-together connection to to at least one of said power supply conductor strips on the plate, and a connector between the slide-together switch contact and an end of a commutating brush held away from a central aperture with remaining end of the said commutating brush being exposed and designed to physically and electrically contact said electric machine commutator on which the brush holder plate assembly is to be mounted.

2. A brush holder plate assembly according to claim 1 wherein said electrical power supply conductor strips are formed on the second flat surface of the brush holder plate and are bent at intermediate points along their lengths and free ends thereof are bent at substantially right angles to an elongate axis of the power supply conductor strips with the bent portions extending through of the brush holder plate and being crimped over so as to secure the power supply conductor strips to the brush holder plate; said conductor strips at points along a length thereof between each set of guiding and support channels having a lip connector of said slide-together switch contact secured thereto with said portion of the lip connector extending through the plate to the first flat surface thereof to form one part of said slide together switch for supplying electric power to or from one of the commutator brushes supported within said readily replaceable brush holder cartridge; said slide together switch contact on each said readily replaceable brush holder cartridge comprises a coacting spade connector secured to an underside of each said brush holder cartridge for making slide-together physical and electrical contact with said lip connector of a respective power supply conductor strip upon the brush holder cartridge being slid into assembled relation on the brush holder plate within the spaced-apart, brush holder cartridge guiding and support channels; a pigtail conductor connected at one end to said coacting space, connector on a selected brush holder cartridge and being electrically connected at a remaining end to a commutating brush slidably supported within the replaceable, brush holder cartridge; and a coiled biasing spring supported within the brush holder cartridge for biasing a remaining exposed end of the commutating brush into engagement with the commutator of said electric machine.

3. A brush holder plate assembly according to claim 1 wherein the elongated power supply conductor strips are blanked out from flat stock conductor material to provide straight, narrow conductor strips of appropriate cross sectional dimensions proportioned to accommodate a predesigned current flow for supply to or from the commutator brushes; the power supply conductor strips thus formed being bent and set into a complementary-shaped set of preformed recessed channels on the second flat surface of the brush holder plate; and with certain of the bent portions of the power supply conductor strips comprising a plurality of integrally formed projecting stakes formed along an edge of each respective strip that extend through the brush holder plate thickness at the bottom of the recessed channels and are crimped to stake in place and hold the power supply conductor strips on the brush holder plate.

4. A brush holder plate assembly according to claim 1 wherein the power supply conductor strips are essentially rectangular in cross section with the wide part of the strip extending vertically relative to the plane of the brush holder plate and disposed in a complementary shaped recessed channel on the second flat surface of the plate and wherein at intermediate points and ends thereof forming an crimped stakes and lip connectors are disposed at right angles to the elongate axis of the power supply conductor strips and extend through the thickness of the brush holder plate to expose the lip connectors to a coacting spade connector on a bottom surface of one of said brush holder cartridges.

5. A brush holder plate assembly according to claim 1 wherein the brush holder plate and the brush holder cartridges are fabricated from thermoplastic insulating material.

6. A brush holder plate assembly according to claim 1 wherein the central aperture is dimensioned to allow the brush holder plate assembly to be slipped on over said commutator of said electric machine after complete assembly of other parts of the machine.

7. A brush holder plate assembly according to claim 2 wherein the elongated power supply conductor strips are blanked out from flat stock material to provide straight narrow conductor strips of appropriate cross sectional dimensions proportioned to accommodate a predesigned current flow for supply to or from the commutating brushes; the power supply conductor strips thus formed being bent and set into a complementary shaped set of preformed recessed channels on the second flat surface of the brush holder plate; and with certain of the bent portions of the power supply conductor strips comprising a plurality of integrally formed projecting stakes on each respective strip that extend through the brush holder plate thickness at a bottom of the recessed channels and are crimped to stake in place and hold the power supply conductor strips on the brush holder plate.

8. A brush holder plate assembly according to claim 7 wherein the power supply conductor strips are essentially rectangular in cross section with a wide part of the strips extending vertically relative to the plane of the brush holder plate while disposed in the recessed channels and wherein intermediate points and ends thereof forming crimped stakes and lip connectors are disposed, at right angles to the elongate axis of the power supply conductor strips and extend through the thickness of the brush holder plate to expose the lip connectors to the coacting spade connectors of the slide-together switch contact formed on a bottom surface of a brush holder cartridge.

9. A brush holder plate assembly according to claim 8 wherein the brush holder plate and the brush holder cartridges are fabricated from thermoplastic insulating material.

10. A brush holder plate assembly according to claim 9 wherein the central aperture in the brush holder plate is dimensioned to allow the brush holder plate assembly to be slipped on over the commutator of said electric machine after complete assembly.

11. A brush holder plate assembly according to claim 1 further including said electric machine and the commutator and wherein the brush holder plate assembly is mounted around the commutator of the electric machine; said electric machine having an outer housing which surrounds and encloses the brush holder plate assembly, and the electric machine outer housing has openings formed therethrough which are radially aligned with outer ends of the guiding and support channels of the brush holder plate assembly and allows selective access to the readily replaceable brush holder cartridges whereby the cartridges readily and selectively can be removed and replaced in a snap-out, snap-in manner for easy replacement of the commutating brushes therein without requiring disassembly of the electric machine outer housing.

12. A brush holder plate assembly according to claim 10 further including said electric machine the commutator and wherein the brush holder plate assembly is mounted around the commutator of the electric machine; said electric machine having an outer housing which surrounds and encloses the brush holder plate assembly, and the electric machine outer housing has openings formed therethrough which are radially aligned with outer ends of the guiding and support channels of the brush holder plate assembly and allows selective access to the readily replaceable brush holder cartridges whereby the cartridges readily and selectively can be removed and replaced in a snap-out, snap-in manner for easy replacement of the commutating brushes therein without requiring disassembly of the outer electric machine housing.

13. In a brush holder plate assembly for mounting a plurality of commutating brushes around an electric machine commutator; the improvement comprising a relatively flat, two-sided brush holder plate fabricated from electrically insulating thermoplastic material; said brush holder plate having a plurality of sets of spaced-apart, parallel, guiding and support channels integrally formed on one flat surface thereof and having a centrally formed aperture therein of sufficient cross sectional dimension to accommodate an electric machine commutator; said sets of spaced-apart, parallel, guiding and support channels projecting radially outward away from the centrally formed aperture like spokes of a wheel; a plurality of readily replaceable snap-in-place brush holder cartridges having slide catches and slide together switch contacts formed thereon slidably secured by said slide catches and said slide together switch contacts to respective sets of the spaced-apart, parallel, guiding and support channels on said brush holder plate for physically supporting the commutating brushes within said brush holder cartridges in an array surrounding the said electric machine commutator; a set of elongated power supply conductor strips formed on a flat second surface of the brush holder plate electrically connected to the commutating brushes secured within said readily replaceable snap-in-place brush holder cartridges and electrically supplied from said power supply conductor strips by means of said slide together switch contacts; and each of said readily replaceable snap-in-place brush holder cartridges further including a coiled biasing spring for spring tensioning an exposed end of each commutating brush contained therein into physical and electrical engagement with said electric machine commutator.

14. A brush holder plate assembly according to claim 13 wherein the power supply conductor strips are formed on the flat second surface of the brush holder plate opposite from said guiding and support channels and wherein the strips have free ends and intermediate portions along the length thereof which are bent substantially at right angles to an elongate axis of the strips; said bent free ends and intermediate portions of the power supply conductor strips extending through thickness of the brush holder plate and being crimped over to secure the conductor strips to the brush holder plate, said conductor strips at points between each set of guiding and support channels having a lip switch connector secured thereto with a lip portion of the lip switch connector extending through and accessible from one side of the brush holder plate to form one part of a slide-together lip switch connector for supplying electric current to or from a respective commutator brush supported within a respective brush holder cartridge; said brush holder cartridges each having a coacting spade connector secured thereto on its underside for making a slide-together physical and electrical contact with a selected lip connector of a respective conductor strip upon the brush holder cartridge with a commutating brush therein being slid into assembled relation on the brush holder plate within the spaced-apart cartridge guiding and support channels; a pigtail conductor connected at one end to said coacting spade connector on a respective brush holder cartridge and being electrically connected at a remaining end to one end of a commutating brush slidably supported within a brush holder cartridge; and a coiled biasing spring supported within the brush holder cartridge for biasing the remaining end of the commutating brush into engagement with the commutator of said electric machine.

15. A brush holder plate assembly according to claim 11 wherein the power supply conductor strips are blanked out from flat stock conductive material to provide straight conductor strips of appropriate cross sectional dimensions proportioned to accommodate a predetermined current flow for supply to or from the commutating brushes; the power supply conductor strips thus formed being secured within preformed, complementary-shaped, recessed channels formed on the second flat surface of the brush holder plate and a plurality of integrally formed stakes formed along an edge of each strip that extend through the brush holder plate recessed channels and are crimped to firmly stake in place and hold the power supply conductor strips on the brush holder plate within the recessed channels.

16. A brush holder plate assembly according to claim 13 wherein the power supply conductor strips are essentially rectangular in cross section with wide part of the strips extending vertically relative to the brush holder plate while disposed in complementary-shaped channels and wherein intermediate points and ends of each conductor strip form crimped stakes and lip connectors and bent to form a right angle with an elongate axis of each conductor strip and extend through thickness of the brush holder plate to expose a lip connector to a coacting spade connector on the bottom side of each brush holder cartridge to thereby form a slide-together terminal lip switch connector for the supply of electric current to or from each commutating brush.

17. A brush holder plate assembly according to claim 13 wherein the central aperture is dimensioned to allow the brush holder plate assembly to be slipped on over the commutator of said electric machine after complete assembly.

18. A brush holder plate assembly according to claim 14 wherein elongate power supply conductor strips are blanked out from flat stock conductive material to provide straight conductor strips of appropriate cross sectional dimensions proportioned to accommodate a predetermined current flow for supply to or from the commutating brushes; the power supply conductor strips thus formed being secured within a set of preformed complementary-shaped recessed channels on the second side of the brush holder plate and a plurality of integrally formed stakes formed along an edge of each strip that extend through the brush holder plate and are crimped to firmly stake in place and hold the power supply conductor strips on the brush holder plate.

19. A brush holder plate assembly according to claim 18 wherein the power supply conductor strips are essentially rectangular in cross section with wide part of the strips extending vertically relative to the plane of the brush holder plate while disposed in the complementary-shaped recessed channels; and wherein the intermediate portions and ends of each conductor strip that form stakes and said lip connectors disposed at right angles to the elongate axis of the conductor strip and extend through of the brush holder plate to expose a lip connector to a coacting spade connector on the bottom surface of a brush holder cartridge to thereby form a slide-together terminal switch connector for the supply of electric current to or from a commutating brush and also serves to further secure the brush holder cartridge in place on the brush holder plate.

20. A brush holder plate assembly according to claim 19 wherein the brush holder plate and the brush holder cartridges are fabricated from said thermoplastic insulating material.

21. A brush holder plate assembly according to claim 20 wherein the central aperture is dimensioned to allow the brush holder plate assembly with the brush holder cartridges mounted thereon to be slipped on over the commutator after complete assembly.

22. A brush holder plate assembly according to claim 13 further including said electric machine commutator and wherein the brush holder plate assembly is mounted around the commutator; said electric machine commutator having an outer housing which surrounds and encloses the brush holder plate assembly, and the electric machine commutator outer housing has openings formed therethrough which are radially aligned with outer ends of the guiding and support channels of the brush holder plate assembly and allows selective access to the readily replaceable snap-in-place brush holder cartridges whereby the cartridges readily and selectively can be removed and replaced in a snap-out, snap-in manner for easy replacement of the commutating brushes therein without requiring disassembly of the electric machine commutator outer housing.

23. A brush holder plate assembly according to claim 21 further including said electric machine commutator and wherein the brush holder plate assembly is mounted around the commutator; said electric machine commutator having an outer housing which surrounds and encloses the brush holder plate assembly, and the electric machine outer housing has openings formed therethrough which are radially aligned with outer ends of the guiding and support channels of the brush holder plate assembly and allows selective access to the readily replaceable snap-in-place brush holder cartridges whereby the cartridges readily and selectively can be removed and replaced in a snap-out, snap-in manner for easy replacement of the commutating brushes therein without requiring disassembly of the electric machine commutator outer housing.

* * * * *